United States Patent
Lee et al.

(10) Patent No.: US 9,473,965 B2
(45) Date of Patent: Oct. 18, 2016

(54) METHOD FOR MONITORING DOWNLINK CONTROL CHANNEL IN WIRELESS COMMUNICATION SYSTEM, AND APPARATUS THEREFOR

(71) Applicant: LG ELECTRONICS INC., Seoul (KR)

(72) Inventors: Seungmin Lee, Anyang-si (KR); Hakseong Kim, Anyang-si (KR); Hanbyul Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/440,528

(22) PCT Filed: Nov. 27, 2013

(86) PCT No.: PCT/KR2013/010831
§ 371 (c)(1),
(2) Date: May 4, 2015

(87) PCT Pub. No.: WO2014/084591
PCT Pub. Date: Jun. 5, 2014

(65) Prior Publication Data
US 2015/0271691 A1    Sep. 24, 2015

Related U.S. Application Data

(60) Provisional application No. 61/730,503, filed on Nov. 27, 2012.

(51) Int. Cl.
*H04W 24/08* (2009.01)
*H04W 72/12* (2009.01)
(Continued)

(52) U.S. Cl.
CPC .......... *H04W 24/08* (2013.01); *H04W 72/1289* (2013.01); *H04W 48/16* (2013.01); *H04W 84/042* (2013.01); *H04W 88/02* (2013.01)

(58) Field of Classification Search
CPC ........... H04W 24/08; H04W 72/1289; H04W 72/1263; H04W 24/00; H04W 24/02; H04W 48/16; H04W 84/042; H04W 88/02
See application file for complete search history.

(56) References Cited

U.S. PATENT DOCUMENTS

2011/0110316 A1    5/2011   Chen et al.
2012/0201230 A1    8/2012   Wang et al.
2012/0281646 A1    11/2012  Liao et al.
(Continued)

FOREIGN PATENT DOCUMENTS

WO    2011/090688    7/2011
WO    2011/132960    10/2011

OTHER PUBLICATIONS

PCT International Application No. PCT/KR2013/010831, Written Opinion of the International Searching Authority dated Mar. 21, 2014, 11 pages.
(Continued)

*Primary Examiner* — Chi H Pham
*Assistant Examiner* — Weibin Huang
(74) *Attorney, Agent, or Firm* — Lee, Hong, Degerman, Kang & Walmey; Jonathan Kang; Michael Monaco

(57) ABSTRACT

The present invention relates to a method for monitoring, by a terminal, an enhanced physical downlink control channel (EPDCCH) in a wireless communication system supporting carrier aggregation. In detail, the method includes the steps of receiving monitoring information about a first cell from a base station and a second cell cross-carrier scheduled from the first cell; and monitoring the EPDCCH on the basis of the monitoring information, wherein the monitoring information includes information that the number of EPDCCH candidates on the first cell is reallocated, when the maximum number of enhanced control channel elements (ECCE)) available in a specific EPDCCH set on the first cell does not support the number of the EPDCCH candidates of an aggregation level with respect to the second cell.

10 Claims, 10 Drawing Sheets

(51) Int. Cl.
*H04W 48/16* (2009.01)
*H04W 84/04* (2009.01)
*H04W 88/02* (2009.01)

(56) References Cited

U.S. PATENT DOCUMENTS

| | | | | |
|---|---|---|---|---|
| 2013/0194931 A1* | 8/2013 | Lee | ............. | H04L 5/0053 370/241 |
| 2014/0036747 A1* | 2/2014 | Nory | ............. | H04W 72/0406 370/311 |
| 2014/0086173 A1* | 3/2014 | Sadeghi | ............. | H04L 5/005 370/329 |
| 2014/0092821 A1* | 4/2014 | Zhu | ............. | H04L 1/1864 370/329 |
| 2014/0126485 A1* | 5/2014 | Chen | ............. | H04L 5/0053 370/329 |
| 2015/0304998 A1* | 10/2015 | Horiuchi | ............. | H04W 72/0446 370/329 |

OTHER PUBLICATIONS

PCT International Application No. PCT/KR2013/010831, Written Opinion of the International Searching Authority dated Mar. 21, 2014, 13 pages.

* cited by examiner

FIG. 2
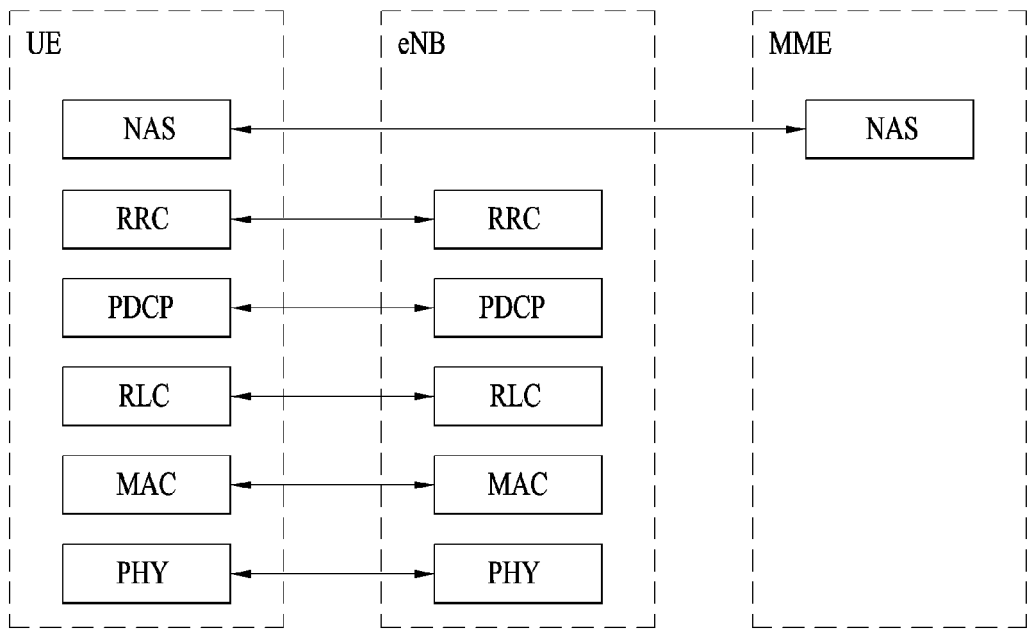
(a) control-plane protocol stack
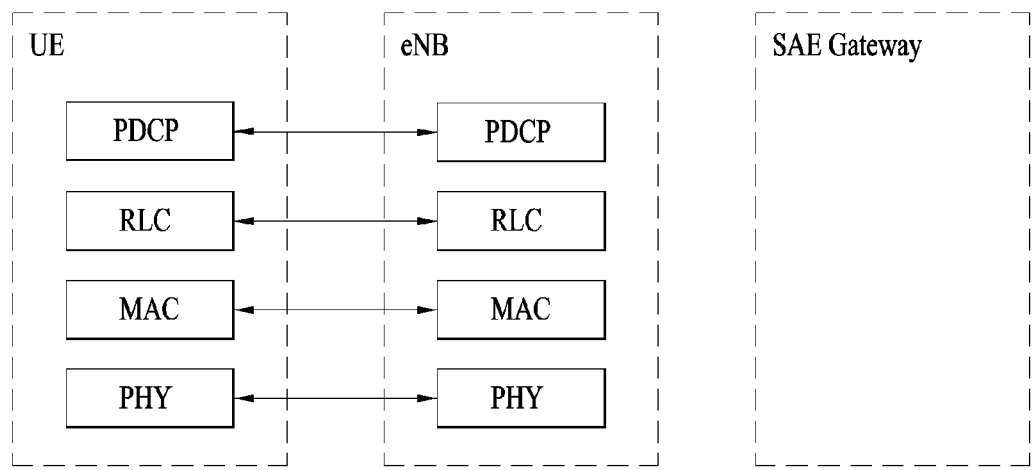
(b) user-plane protocol stack FIG. 7
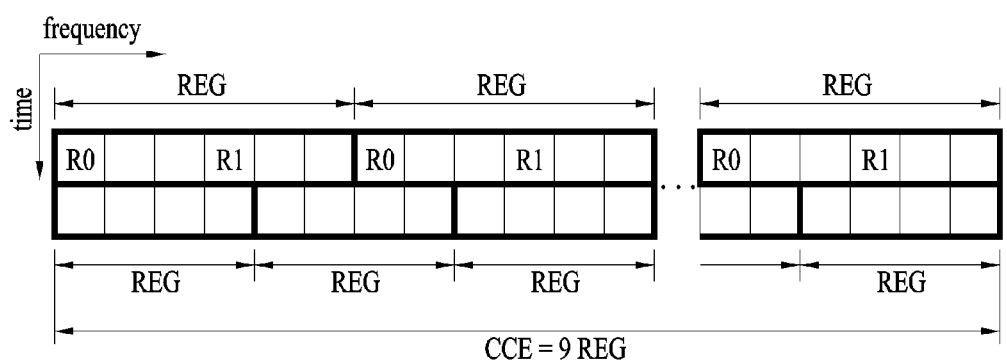
(a) 1TX or 2TX
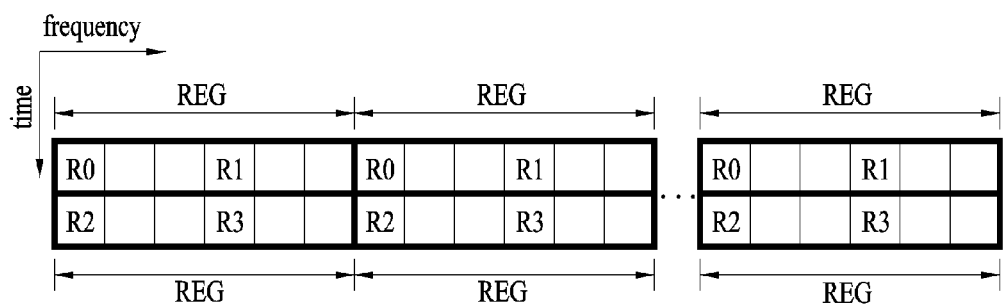
(b) 4 TX

METHOD FOR MONITORING DOWNLINK CONTROL CHANNEL IN WIRELESS COMMUNICATION SYSTEM, AND APPARATUS THEREFOR

CROSS-REFERENCE TO RELATED APPLICATIONS

This application is the National Stage filing under 35 U.S.C. 371 of International Application No. PCT/KR2013/010831, filed on Nov. 27, 2013, which claims the benefit of U.S. Provisional Application No. 61/730,503, filed on Nov. 27, 2012, the contents of which are all hereby incorporated by reference herein in their entirety.

TECHNICAL FIELD

The present invention relates to wireless communication system, and more particularly, to a method for enabling a user equipment to monitor a downlink control channel in a wireless communication system and an apparatus therefor.

BACKGROUND ART

As an example of a mobile communication system to which the present invention is applicable, a 3rd generation partnership project long term evolution (3GPP LTE) (hereinafter, referred to as LTE) communication system is described in brief.

FIG. 1 is a diagram schematically illustrating a network structure of an E-UMTS as an exemplary radio communication system. An evolved universal mobile telecommunications system (E-UMTS) is an advanced version of a legacy universal mobile telecommunications system (UMTS) and basic standardization thereof is currently underway in the 3GPP. E-UMTS may be referred to as an LTE system. For details of the technical specifications of UMTS and E-UMTS, reference can be made to Release 7 and Release 8 of "3rd Generation Partnership Project; Technical Specification Group Radio Access Network".

Referring to FIG. 1, E-UMTS includes a user equipment (UE), evolved Node Bs (eNode Bs or eNBs), and an access gateway (AG) which is located at an end of an evolved UMTS terrestrial radio access network (E-UTRAN) and connected to an external network. The eNBs may simultaneously transmit multiple data streams for a broadcast service, a multicast service, and/or a unicast service.

One or more cells are present per eNB. A cell is configured to use one of bandwidths of 1.44, 3, 5, 10, 15, and 20 MHz to provide a downlink (DL) or uplink (UL) transmission service to multiple UEs. Different cells may be configured to provide different bandwidths. The eNB controls data transmission and reception to and from a plurality of UEs. Regarding DL data, the eNB transmits DL scheduling information to notify a corresponding UE of a time/frequency domain within which data is to be transmitted, coding, data size, and hybrid automatic repeat and request (HARQ)-related information. In addition, regarding UL data, the eNB transmits UL scheduling information to a corresponding UE to inform the UE of an available time/frequency domain, coding, data size, and HARQ-related information. An interface for transmitting user traffic or control traffic between eNBs may be used. A core network (CN) may include the AG and a network node for user registration of the UE. The AG manages mobility of the UE on a tracking area (TA) basis, each TA including a plurality of cells.

Although radio communication technology has been developed up to LTE based on wideband code division multiple access (WCDMA), demands and expectations of users and providers continue to increase. In addition, since other radio access technologies continue to be developed, new advances in technology are required to secure future competitiveness. For example, decrease of cost per bit, increase of service availability, flexible use of a frequency band, simplified structure, open interface, appropriate power consumption of a UE, etc. are required.

DISCLOSURE

Technical Problem

An object of the present invention devised to solve the conventional problem is to provide a method for enabling a user equipment to monitor a downlink control channel in a wireless communication system and an apparatus therefor.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

To solve the aforementioned technical problems, according to one aspect of the present invention, a method for enabling a user equipment to monitor an enhanced physical downlink control channel (EPDCCH) in a wireless communication system, which supports carrier aggregation, comprises the steps of receiving, from a base station, monitoring information on a first cell and a second cell cross-carrier scheduled from the first cell; and monitoring the EPDCCH on the basis of the monitoring information, wherein the monitoring information includes information that the number of EPDCCH candidates on the first cell is reallocated, when the maximum number of enhanced control channel elements (ECCE)) available in a specific EPDCCH set on the first cell does not support the number of the EPDCCH candidates of a special aggregation level related to the second cell.

Moreover, the information that the number of EPDCCH candidates on the first cell is reallocated is information allocated as the number of EPDCCH candidates, which exceeds the maximum number of ECCEs available in the special EPDCCH set on the first cell, is omitted.

Moreover, the information that the number of EPDCCH candidates on the first cell is reallocated is information that the number of EPDCCH candidates is reallocated at an aggregation level less than the special aggregation level.

Moreover, the information that the number of EPDCCH candidates on the first cell is reallocated is information that the number of EPDCCH candidates on the second cell for the special EPDCCH set is reallocated as the number of EPDCCH candidates on the first cell for the special aggregation level.

Moreover, the first cell is a scheduling cell, and the second cell is a scheduled cell.

To solve the aforementioned technical problems, according to another aspect of the present invention, a user equipment for monitoring an enhanced physical downlink control channel (EPDCCH) in a wireless communication system, which supports carrier aggregation, comprises a radio frequency (RF) unit; and a processor, wherein the processor is configured to receive, from a base station, monitoring information on a first cell and a second cell cross-carrier scheduled from the first cell and monitor the EPDCCH on the basis of the monitoring information, and the monitoring information includes information that the number of EPDCCH candidates on the first cell is reallocated, when the maximum number of enhanced control channel elements (ECCE)) available in a specific EPDCCH set on the first cell does not support the number of the EPDCCH candidates of a special aggregation level related to the second cell.

Moreover, the information that the number of EPDCCH candidates on the first cell is reallocated is information allocated as the number of EPDCCH candidates, which exceeds the maximum number of ECCEs available in the special EPDCCH set on the first cell, is omitted.

Moreover, the information that the number of EPDCCH candidates on the first cell is reallocated is information that the number of EPDCCH candidates is reallocated at an aggregation level less than the special aggregation level.

Moreover, the information that the number of EPDCCH candidates on the first cell is reallocated is information that the number of EPDCCH candidates on the second cell for the special EPDCCH set is reallocated as the number of EPDCCH candidates on the first cell for the special aggregation level.

Moreover, the first cell is a scheduling cell, and the second cell is a scheduled cell.

Advantageous Effects

According to the present invention, the downlink control channel of the user equipment may effectively be monitored in the wireless communication system.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 2 is a diagram illustrating structures of a control plane and a user plane of a radio interface protocol between a user equipment and an E-UTRAN based on the 3GPP radio access network standard;

FIG. 7 is a diagram illustrating a resource unit used to configure a downlink control channel in an LTE system;

BEST MODE FOR CARRYING OUT THE INVENTION

Figure 1:
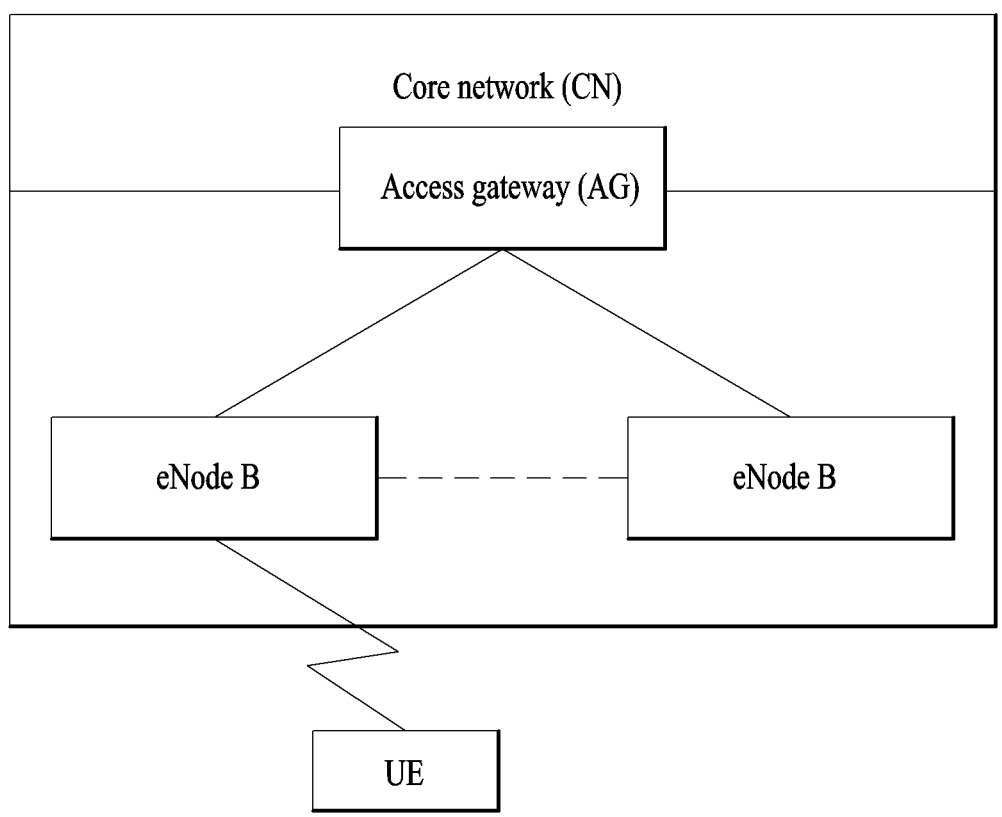
FIG. 1 is a diagram illustrating a network structure of an Evolved Universal Mobile Telecommunications System (E-UMTS) which is an example of a wireless communication system.

The following technology may be applied to a variety of wireless access systems using code division multiple access (CDMA), frequency division multiple access (FDMA), time division multiple access (TDMA), orthogonal frequency division multiple access (OFDMA), single carrier frequency division multiple access (SC-FDMA), and the like. CDMA may be embodied through radio technology such as universal terrestrial radio access (UTRA) or CDMA2000. TDMA may be embodied through radio technology such as global system for mobile communications (GSM)/general packet radio service (GPRS)/enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802-20, and evolved UTRA (E-UTRA). UTRA is a part of a universal mobile telecommunications system (UMTS). 3GPP LTE is a part of evolved UMTS (E-UMTS) using E-UTRA. 3GPP LTE employs OFDMA in DL and SC-FDMA in UL. LTE-advanced (LTE-A) is an evolved version of 3GPP LTE.

For clarity of description, the following description focuses on the 3GPP LTE/LTE-A system. However, the technical features of the present invention are not limited thereto. Specific terms used in the following description are provided to aid in understanding the present invention. These specific terms may be replaced with other terms within the scope and spirit of the present invention.

FIG. 2 is a diagram illustrating structures of a control plane and a user plane of a radio interface protocol between a UE and an E-UTRAN based on 3GPP radio access network specifications. The control plane refers to a path used for transmission of control messages, which is used by the UE and the network to manage a call. The user plane refers to a path in which data generated in an application layer, e.g. voice data or Internet packet data, is transmitted.

A physical layer, which is a first layer, provides an information transfer service to an upper layer using a physical channel. The physical layer is connected to a media access control (MAC) layer of an upper layer via a transmission channel (an antenna port channel). Data is transmitted between the MAC layer and the physical layer via the transmission channel. Data is also transmitted between a physical layer of a transmitter and a physical layer of a receiver via a physical channel. The physical channel uses time and frequency as radio resources. Specifically, the physical channel is modulated using an OFDMA scheme in DL and is modulated using an SC-FDMA scheme in UL.

The MAC layer, which is a second layer, provides a service to a radio link control (RLC) layer of an upper layer via a logical channel. The RLC layer of the second layer supports reliable data transmission. The function of the RLC layer may be implemented by a functional block within the MAC layer. A packet data convergence protocol (PDCP) layer of the second layer performs a header compression function to reduce unnecessary control information for efficient transmission of an Internet protocol (IP) packet such as an IPv4 or IPv6 packet in a radio interface having a relatively narrow bandwidth.

A radio resource control (RRC) layer located at the bottommost portion of a third layer is defined only in the control plane. The RRC layer controls logical channels, transmission channels, and physical channels in relation to configuration, re-configuration, and release of radio bearers. A radio bearer refers to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A non-access stratum (NAS) layer located at an upper level of the RRC layer performs functions such as session management and mobility management.

One cell constituting an eNB is configured to use one of bandwidths of 1.4, 3, 5, 10, and 20 MHz to provide a DL or UL transmission service to a plurality of UEs. Different cells may be configured to provide different bandwidths.

DL transmission channels for data transmission from the network to the UE include a broadcast channel (BCH) for transmitting system information, a paging channel (PCH) for transmitting paging messages, and a DL shared channel (SCH) for transmitting user traffic or control messages. Traffic or control messages of a DL multicast or broadcast service may be transmitted through the DL SCH or may be transmitted through an additional DL multicast channel (MCH). Meanwhile, UL transmission channels for data transmission from the UE to the network include a random access channel (RACH) for transmitting initial control messages and a UL SCH for transmitting user traffic or control messages. Logical channels, which are located at an upper level of the transmission channels and are mapped to the transmission channels, include a broadcast control channel (BCCH), a paging control channel (PCCH), a common control channel (CCCH), a multicast control channel (MCCH), and a multicast traffic channel (MTCH).

Figure 3:
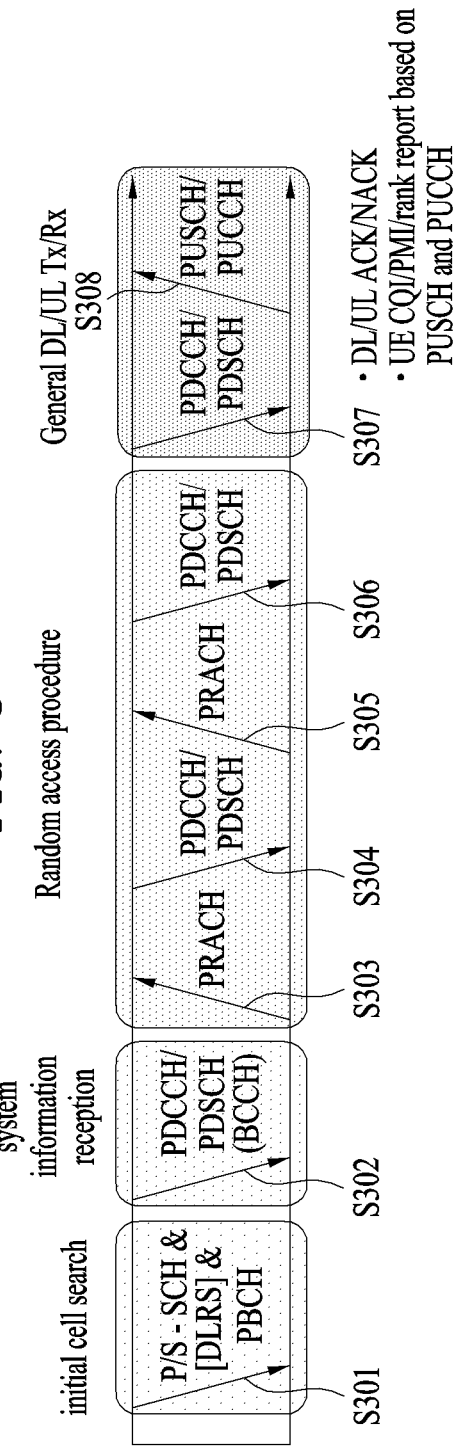
FIG. 3 is a diagram illustrating physical channels used in a 3GPP LTE system and a general method for transmitting a signal using the physical channels.

FIG. 3 is a diagram illustrating physical channels used in a 3GPP system and a general signal transmission method using the same.

When a UE is powered on or enters a new cell, the UE performs initial cell search such as synchronization acquisition with an eNB in step S301. To this end, the UE may receive a primary synchronization channel (P-SCH) and a secondary synchronization channel (S-SCH) from the eNB, establish synchronization with the eNB, and acquire information such as a cell identity (ID). Thereafter, the UE may receive a physical broadcast channel (PBCH) from the eNB to acquire information broadcast in the cell. Meanwhile, the UE may receive a DL reference signal (RS) in the initial cell search step to confirm a DL channel state.

Upon completion of initial cell search, the UE may receive a physical downlink control channel (PDCCH) and a physical downlink shared channel (PDSCH) according to information included in the PDCCH to acquire more detailed system information in step S302.

Next, the UE may perform a random access procedure such as steps S303 to S306 to complete access to the eNB. To this end, the UE may transmit a preamble through a physical random access channel (PRACH) (S303) and receive a response message to the preamble through the PDCCH and the PDSCH corresponding to the PDCCH (S304). In the case of contention-based random access, a contention resolution procedure including transmission of a PRACH signal (S305) and reception of a PDCCH signal and a PDSCH signal corresponding to the PDCCH signal (S306) may be additionally performed.

The UE which has performed the above procedures may receive a PDCCH and/or PDSCH signal (step S307) and transmit a physical uplink shared channel (PUSCH) and/or physical uplink control channel (PUCCH) signal (step S308) according to a general UL/DL signal transmission procedure. Control information that the UE transmits to the eNB is referred to as uplink control information (UCI). The UCI includes a hybrid automatic repeat and request (HARQ) acknowledgement (ACK)/negative ACK (NACK), a scheduling request (SR), channel state information (CSI), etc. In the present disclosure, HARQ ACK/NACK is shortened to HARQ-ACK or ACK/NACK (A/N). HARQ-ACK includes at least one of positive ACK (simply, ACK), negative ACK (simply, NACK), discontinuous transmission (DTX), and NACK/DTX. The CSI includes a channel quality indicator (CQI), a precoding matrix index (PMI), a rank indicator (RI), etc. While UCI is generally transmitted on a PUCCH, if control information and traffic data are to be transmitted simultaneously, the UCI may be transmitted on a PUSCH. The UCI may be transmitted aperiodically on the PUSCH upon request/command of a network.

Figure 4:
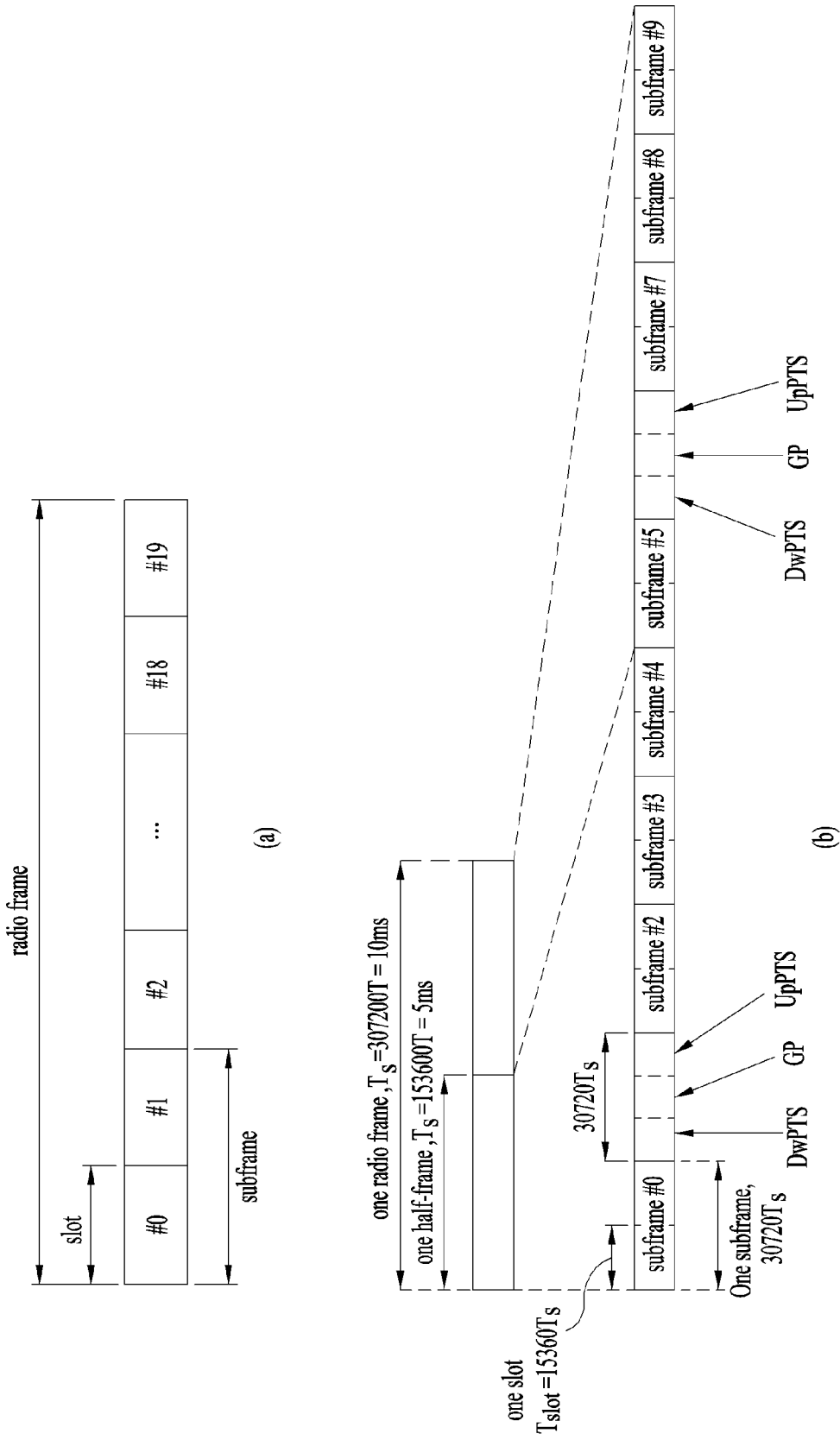
FIG. 4 is a diagram illustrating a structure of a radio frame used in an LTE system.

FIG. 4 is a diagram illustrating the structure of a radio frame used in an LTE system.

Referring to FIG. 4, in a cellular orthogonal frequency division multiplexing (OFDM) wireless packet communication system, UL/DL data packets are transmitted in subframes. One subframe is defined as a predetermined time interval including a plurality of OFDM symbols. The 3GPP LTE standard supports a type 1 radio frame structure applicable to frequency division duplex (FDD) and a type 2 radio frame structure applicable to time division duplex (TDD).

FIG. 4(a) is a diagram illustrating the structure of the type 1 radio frame. A DL radio frame includes 10 subframes, each subframe including two slots in the time domain. A time required to transmit one subframe is defined as a Transmission Time Interval (TTI). For example, one subframe may be 1 ms long and one slot may be 0.5 ms long. One slot includes a plurality of OFDM symbols in the time domain and a plurality of resource blocks (RBs) in the frequency domain. Since 3GPP LTE uses OFDMA for DL, an OFDM symbol is one symbol period. The OFDM symbol may be called an SC-FDMA symbol or symbol period. An RB is a resource allocation unit including a plurality of contiguous subcarriers in one slot.

The number of OFDM symbols included in one slot may be changed according to the configuration of a cyclic prefix (CP). There are two types of CPs, extended CP and normal CP. For example, if each OFDM symbol is configured to include a normal CP, one slot may include 7 OFDM symbols. If each OFDM symbol is configured to include an extended CP, the length of an OFDM symbol is increased and thus the number of OFDM symbols included in one slot is less than that in the case of a normal CP. In the case of the extended CP, for example, one slot may include 6 OFDM symbols. If a channel state is unstable, as is the case when the UE rapidly moves, the extended CP may be used in order to further reduce inter-symbol interference.

In the case of the normal CP, since one slot includes 7 OFDM symbols, one subframe includes 14 OFDM symbols. Up to first three OFDM symbols of each subframe may be allocated to a PDCCH and the remaining OFDM symbols may be allocated to a PDSCH.

FIG. 4(b) illustrates the structure of the type 2 radio frame. The type 2 radio frame includes two half frames, each half frame including four general subframes each having two slots and one special subframe including a downlink pilot time slot (DwPTS), a guard period (GP), and an uplink pilot time slot (UpPTS).

In the special subframe, the DwPTS is used for initial cell search, synchronization, or channel estimation at a UE, and the UpPTS is used for channel estimation and UL transmission synchronization with a UE at an eNB. That is, the DwPTS is used for DL transmission and the UpPTS is used for UL transmission. Particularly, the UpPTS is used for transmission of a PRACH preamble or a sounding reference signal (SRS). The GP is used to cancel UL interference between UL and DL, caused by multi-path delay of a DL signal.

The current 3GPP standard specification defines the following configurations listed in Table 1 below for the special subframe. Table 1 illustrates DwPTSs and UpPTSs in the case where $T_s=1/(15000\times2048)$. The remaining region except for a DwPTS and an UpPTS is set as a GP.

The above-described structures of radio frames are purely exemplary. Accordingly, the number of subframes in a radio frame, the number of slots in a subframe, and the number of symbols in a slot may be changed in various manners.

Figure 5:
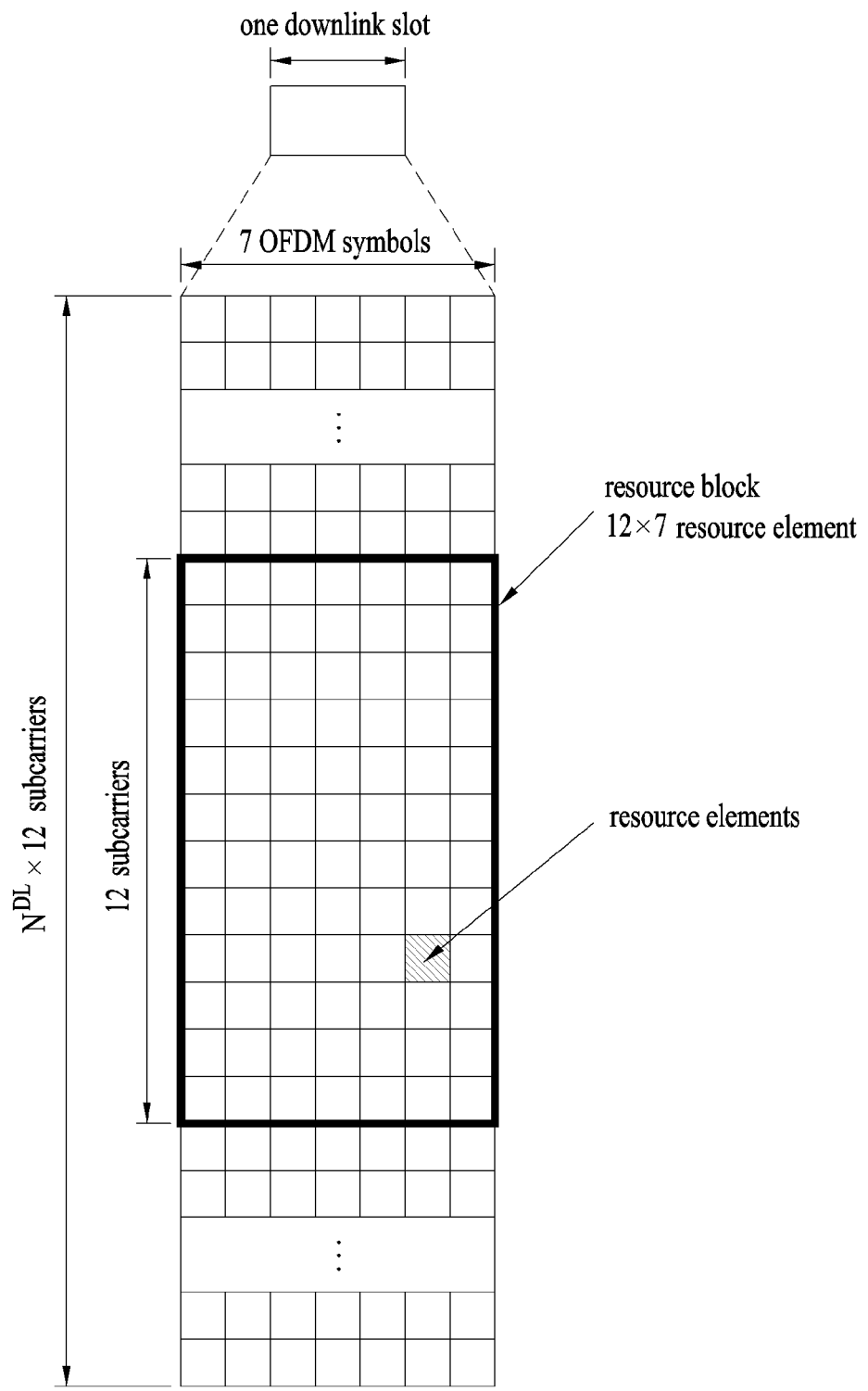
FIG. 5 is a diagram illustrating an example of a resource grid of a downlink slot.

FIG. 5 illustrates a resource grid of a DL slot.

Referring to FIG. 5, a DL slot includes $N_{symb}^{DL}$ OFDM symbols in the time domain and $N_{RB}^{DL}$ RBs in the frequency domain. Each RB includes $N_{sc}^{RB}$ subcarriers and thus the DL slot includes $N_{RB}^{DL} \times N_{sc}^{DL}$ subcarriers in the frequency domain. Although FIG. 5 illustrates the case in which a DL slot includes 7 OFDM symbols and an RB includes 12 subcarriers, the present invention is not limited thereto. For example, the number of OFDM symbols included in the DL slot may differ according to CP length.

Each element on the resource grid is referred to as a resource element (RE). One RE indicated by one OFDM symbol index and one subcarrier index. One RB includes $N_{symb}^{DL} \times N_{sc}^{RB}$ REs. The number of RBs, $N_{RB}^{DL}$, included in a DL slot depends on DL bandwidth configured in a cell.

Figure 6:
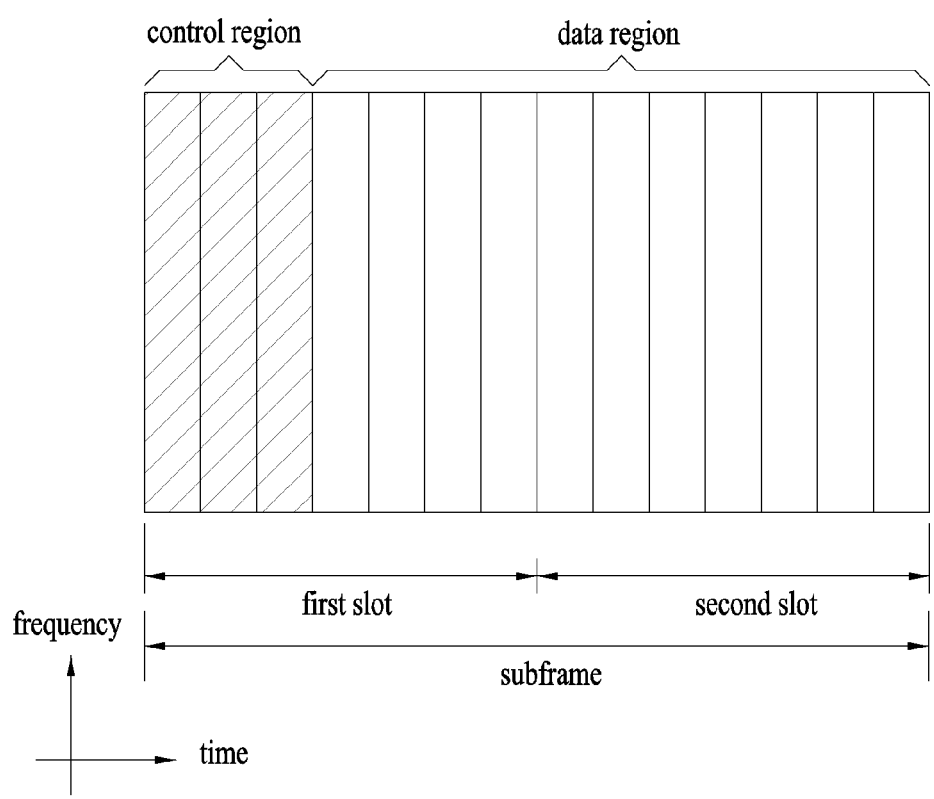
FIG. 6 is a diagram illustrating a structure of a downlink subframe.

FIG. 6 illustrates the structure of a DL subframe.

Referring to FIG. 6, up to three or four OFDM symbols at the start of the first slot of a DL subframe are used as a control region to which control channels are allocated and the other OFDM symbols of the DL subframe are used as a data region to which a PDSCH is allocated. DL control channels defined for the LTE system include a physical

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Meanwhile, the type 2 radio frame structure, that is, UL/DL subframe configurations in a TDD system are listed in Table 2.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 2, D represents a DL subframe, U represents a UL subframe, and S represents a special subframe. Table 2 further illustrates DL-to-UL switch point periodicities for the respective UL/DL subframe configurations in the system.

control format indicator channel (PCFICH), a physical downlink control channel (PDCCH), and a physical hybrid ARQ indicator channel (PHICH). The PCFICH is transmitted in the first OFDM symbol of a subframe, carrying information about the number of OFDM symbols used for transmission of control channels in the subframe. The PHICH delivers a HARQ ACK/NACK signal as a response to UL transmission.

Control information carried on the PDCCH is called downlink control information (DCI). The DCI transports resource allocation information and other control information for a UE or a UE group. For example, the DCI includes DL/UL scheduling information, UL transmit (Tx) power control commands, etc.

The PDCCH delivers information about resource allocation and a transport format for a downlink shared channel (DL-SCH), information about resource allocation and a transport format for an uplink shared channel (UL-SCH), paging information of a paging channel (PCH), system information on the DL-SCH, information about resource allocation for a higher-layer control message such as a random access response transmitted on the PDSCH, a set of transmit power control commands for individual UEs of a UE group, transmit power control commands, voice over Internet protocol (VoIP) activation indication information, etc. A plurality of PDCCHs may be transmitted in the control region. A UE may monitor a plurality of PDCCHs. A PDCCH is transmitted on an aggregate of one or more consecutive control channel elements (CCEs). A CCE is a logical allocation unit used to provide a PDCCH at a coding rate based on the state of a radio channel. A CCE includes a plurality of resource element groups (REGs). The format of a PDCCH and the number of available bits for the PDCCH are determined according to the number of CCEs. An eNB determines a PDCCH format according to DCI transmitted to a UE and attaches a cyclic redundancy check (CRC) to control information. The CRC is masked by an identifier (ID) (e.g. a radio network temporary identifier (RNTI)) according to the owner or use of the PDCCH. If the PDCCH is destined for a specific UE, the CRC may be masked by a cell-RNTI (C-RNTI) of the UE. If the PDCCH carries a paging message, the CRC thereof may be masked by a paging ID (P-RNTI). If the PDCCH carries system information (particularly, a system information block (SIB)), the CRC thereof may be masked by a system information RNTI (SI-RNTI). If the PDCCH is designated as a random access response, the CRC thereof may be masked by a random access-RNTI (RA-RNTI).

FIG. 7 is a diagram illustrating a resource unit used to configure a downlink control channel in an LTE system. In particular, FIG. 7(a) illustrates that the number of transmitting antennas is 1 or 2, and FIG. 7(b) illustrates that the number of transmitting antennas is 4. Although RS (Reference Signal) patterns of FIG. 7(a) and FIG. 7(b) are different from each other in accordance with the number of transmitting antennas, a configuration method of a resource unit related to a control channel is equally applied to FIG. 7(a) and FIG. 7(b).

Referring to FIG. 7, a basic resource unit for the downlink control channel is a resource element group (REG). The REG includes four neighboring resource elements excluding the reference signal (RS). The REG is illustrated with a solid line. The PCFICH and the PHICH include four REGs and three REGs, respectively. The PDCCH is configured in a unit of CCE (control channel element), one CCE including nine REGs.

The user equipment is configured to identify $M^{(L)}(\geq L)$ number of CCEs, which are continuous or arranged in accordance with a specific rule, thereby identifying whether PDCCH of L number of CCEs is transmitted thereto. A plurality of values of L may be considered by the user equipment to receive the PDCCH. CCE aggregations that should be identified by the user equipment to receive the PDCCH will be referred to as a search space. For example, the LTE system defines the search space as illustrated in Table 3 below.

TABLE 3

| Type | Search space $S_k^{(L)}$ Aggregation level L | Size [in CCEs] | Number of PDCCH candidates $M^{(L)}$ |
|---|---|---|---|
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

In this case, CCE aggregation level L represents the number of CCEs constituting the PDCCH, $S_k^{(L)}$ represents a search space of the CCE aggregation level L, and $M^{(L)}$ is the number of candidate PDCCH that should be monitored at the search space of the aggregation level L.

The search space may be divided into a UE-specific search space that allows access for only a specific user equipment and a common search space that allows access for all user equipments within a cell. The user equipment monitors a common search space of the CCE aggregation levels of 4 and 8, and monitors a UE-specific search space of the CCE aggregation levels of 1, 2, 4 and 8. The common search space and the UE-specific search space may be overlapped with each other.

Furthermore, in a PDCCH search space given to a random user equipment for each CCE aggregation level value, the location of the first CCE (i.e., CCE having the smallest index) is varied per subframe depending on the user equipment. This will be referred to as PDCCH search space hashing.

The CCEs may be distributed in a system band. In more detail, a plurality of CCEs which are logically continuous may be input to an interleaver. The interleaver performs interleaving for the input CCEs in a unit of REG. Accordingly, frequency/time resources constituting one CCE are physically distributed in the entire frequency/time domain within the control region of the subframe. Finally, although the control channel is configured in a unit of CCE, interleaving is performed in a unit of REG, whereby frequency diversity and interference randomization gain may be maximized.

Figure 8:
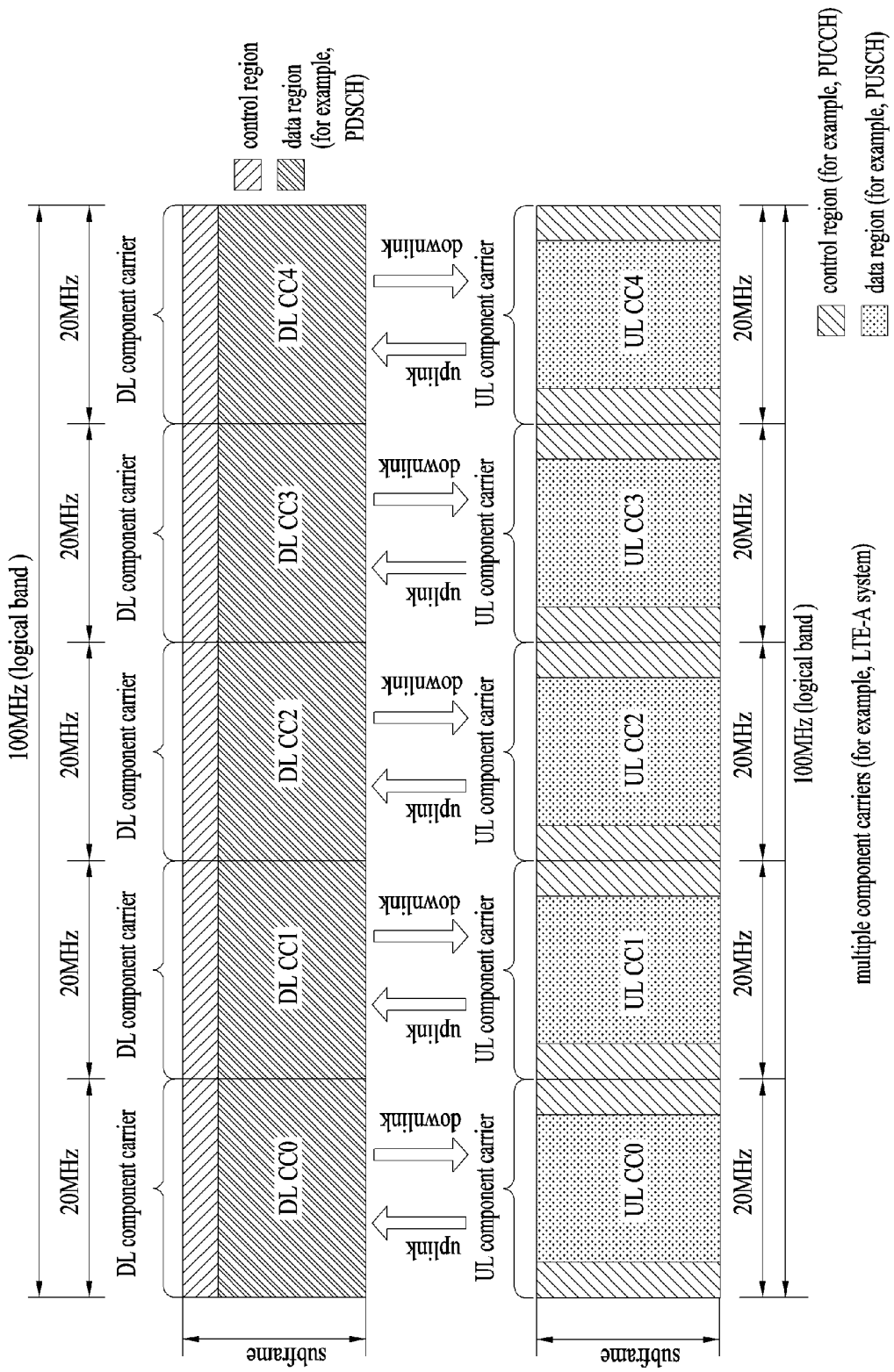
FIG. 8 is a diagram illustrating a carrier aggregation (CA) communication system.

FIG. 8 is a diagram illustrating a carrier aggregation (CA) communication system.

Referring to FIG. 8, a plurality of uplink/downlink component carriers (CC) may be collected to support wider uplink/downlink bandwidths. The terminology "component carrier (CC)" may be replaced with another equivalent terminology (for example, carrier, cell, etc.). The respective CCs may adjoin each other or not in the frequency domain. A bandwidth of each component carrier may be defined independently. Asymmetric carrier aggregation where the number of UL CCs is different from the number of DL CCs may be performed. Meanwhile, the control information may be set to be transmitted and received through a specific CC only. This specific CC may be referred to as a primary CC (PCC), and the other CCs may be referred to as secondary CCs (SCCs).

For cross-carrier scheduling, a carrier indicator field (CIF) is used. Configuration of the presence or not of the CIF within the PDCCH may be enabled by upper layer signaling (for example, RRC signaling) semi-statically and user equipment-specifically (or user equipment group-specifically). The base line of PDCCH transmission may be summed up as follows.

CIF disabled: the PDCCH on the DL CC allocates PDSCH resource on the same DL CC or PUSCH resource on one linked UL CC.
  No CIF
CIF enabled: the PDCCH on the DL CC may allocate PDSCH or PUSCH resource on one DL/UL CC of a plurality of aggregated DL/UL CCs by using the CIF.
  LTE DCI format extended to have CIF
  CIF (if configured) is a fixed x-bit field (for example, x=3)
  CIF (if configured) location is fixed regardless of DCI format size.
  Reuse of LTE PDCCH structure (same coding, same CCE-based resource mapping)

If the CIF exists, the base station may allocate a PDCCH monitoring DL CC (set) to reduce complexity of BD in view of the user equipment. The PDCCH monitoring DL CC set is a portion of the entire aggregated DL CCs and includes one or more DL CCs, and the user equipment performs detection/decoding of the PDCCHs on the corresponding DL CC only. That is, if the base station performs PDSCH/PUSCH scheduling to the user equipment, the PDCCH is transmitted through the PDCCH monitoring DL CC set only. The PDCCH monitoring DL CC set may be set UE-specifically, UE-group-specifically or cell-specifically. The terminology "PDCCH monitoring DL CC" may be replaced with another equivalent terminology such as monitoring carrier, monitoring cell, etc. Also, the CC aggregated for the user equipment may be replaced with another equivalent terminology such as serving CC, serving carrier, serving cell, etc.

Figure 9:
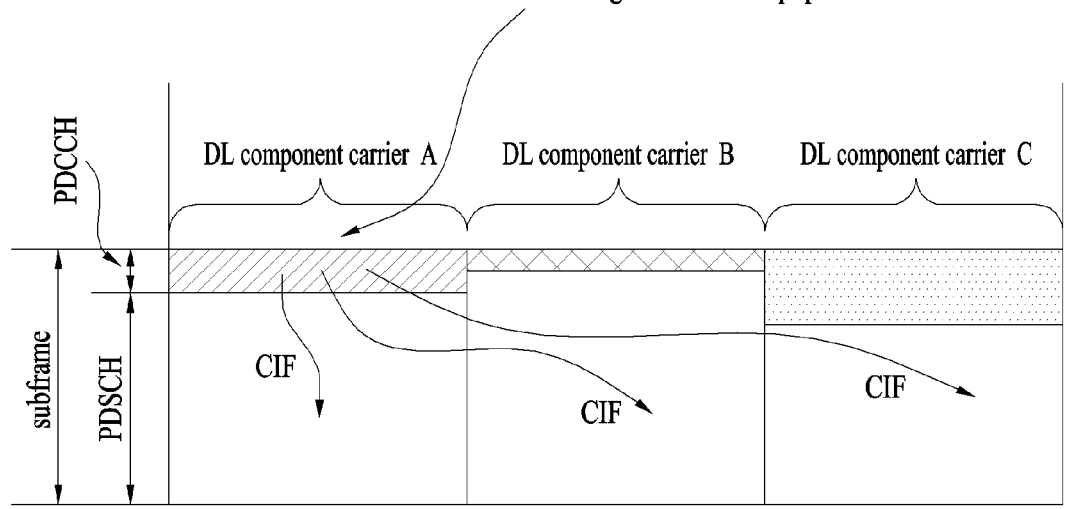
FIG. 9 is a diagram illustrating scheduling corresponding to a case where a plurality of carriers are aggregated.

FIG. 9 is a diagram illustrating scheduling corresponding to a case where a plurality of carriers are aggregated. It is assumed that three DL CCs are aggregated. It is also assumed that DL CC A is set to a monitoring DL CC. Each of DL CC A to DL CC C may be referred to as serving carrier, serving cell, etc. If the CIF is disabled, each DL CC may transmit only the PDCCH that schedules a PDSCH of each DL CC without CIF in accordance with the LTE PDCCH configuration. On the other hand, if the CIF is enabled by UE-specific (or UE-group-specific or cell-specific) upper layer signaling, the DL CC A (monitoring DL CC) may transmit the PDCCH, which schedules the PDSCH of another CC as well as the PDSCH of the DL CC A, by using the CIF. In this case, the PDCCH is not transmitted from the DL CC B and DL CC C which are not set to the PDCCH monitoring DL CC. Therefore, the DL CC A (monitoring DL CC) should include all of a PDCCH search space related to DL CC A, a PDCCH search space related to DL CC B, and a PDCCH search space related to DL CC C. In this specification, it is assumed that the PDCCH search space is defined per carrier.

As described above, the LTE-A system considers a use of the CIF within the PDCCH for cross-CC scheduling. The use or non-use of the CIF (that is, support of cross-CC scheduling mode or non-cross-CC scheduling mode) and mode switching may be configured semi-statically/UE-specifically through RRC signaling. After the corresponding signaling, the user equipment may recognize whether the CIF is used within the PDCCH which will be scheduled thereto.

Figure 10:
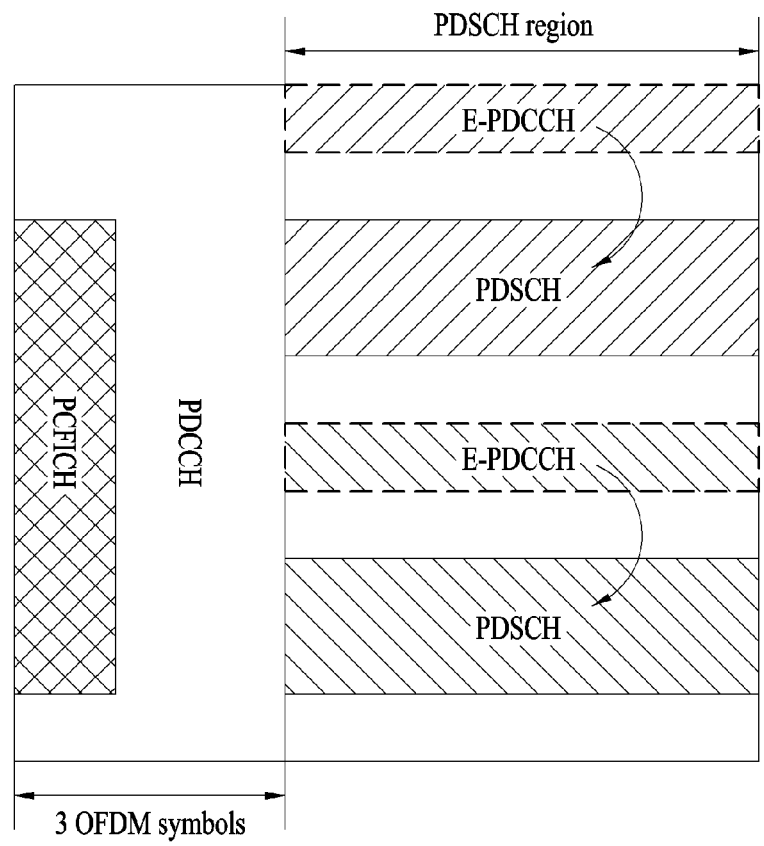
FIG. 10 is a diagram illustrating an example of an EPDCCH and a PDSCH scheduled by the EPDCCH.

FIG. 10 is a diagram illustrating an example of an EPDCCH and a PDSCH scheduled by the EPDCCH.

Referring to FIG. 10, the EPDCCH may be used by partially defining a PDSCH region for transmitting data, and the user equipment should perform a blind decoding procedure for detecting the presence of its EPDCCH. Although the EPDCCH performs the same scheduling operation (that is, PDSCH and PUSCH control) as that of the conventional legacy PDCCH, a greater number of EPDCCHs may be allocated to the PDSCH region if the number of user equipments which have accessed the same node as that of RRH. In this case, the number of times for blinding decoding that should be performed by the user equipment may be increased, whereby a problem may exist in that complexity may be increased.

Based on the aforementioned description, the present invention will be described. The present invention suggests a method for effectively determining aggregation level (AL) candidates, which may be configured on a specific EPDCCH set under an environment where an enhanced downlink control channel (enhanced PDCCH, EPDCCH) which is a control channel transmitted from the legacy PDSCH region on behalf of the existing (legacy) PDCCH, and the number of EPDCCH candidates of the corresponding aggregation level candidates.

In the present invention, the PDSCH region will be defined as a region configured by the other OFDM symbols except first some OFDM symbols used for legacy PDCCH transmission at a subframe (SF) comprised of a plurality of OFDM symbols. Also, the present invention may be applied to a case where all the OFDM symbols of the corresponding subframe are designated as the PDSCH region as no OFDM symbol used for PDCCH transmission exists. Also, it will be apparent that the EPDCCH which will be described later may be used for communication between a relay and the base station as well as communication between the user equipment and the base station.

Prior to detailed description of the present invention, for convenience of description, a basic unit of resources constituting the EPCCH will be referred to as ECCE, and the corresponding ECCE includes the number of resource elements (REs) (or EREGs) which are previously defined. Also, if the number of ECCEs used for special EPDCCH transmission is N, it will be expressed as Aggregation Level (AL) N. Hereinafter, for convenience of description, the suggested method will be described based on the 3GPP LTE system. However, the range of the system to which the present invention is applied may be extended to another system in addition to the 3GPP LTE system.

As an embodiment of the present invention, if EPDCCH based CCS (Cross Carrier Scheduling) is applied under the environment to which Carrier Aggregation (CA) is applied, a plurality of EPDCCH Sets on a scheduling cell need control information transmission for their cell (i.e., scheduling cell) and M number of scheduled cells cross carrier scheduled (CCS) therefrom. For example, in this case, each EPDCCH set on the scheduling cell may be configured to support control information transmission for the scheduling cell and the scheduled cell by applying a rule for simply increasing the number of EPDCCH candidates for AL candidates, which are previously defined (similarly to operation of the legacy PDCCH), to (M+1) times.

However, since the number of ECCEs that may be used within the maximum range is limited to each of previously defined EPDCCH sets on the scheduling cell, all the EPDCCH candidates of (M+1) times for special AL candidates cannot be received. For example, if two EPDCCH sets (i.e., EPDCCH set #1 and EPDCCH set #2) on the scheduling cell include 8 PRB pairs and 2 PRB pairs, respectively, it is assumed that one PRP pair includes 4 ECCEs, a candidate for blind decoding (BD) for the aggregation level {1, 2, 4, 8, 16} with respect to the EPDCCH set #1 is set to {3, 3, 3, 1, 1}, and a candidate for blind decoding (BD) for the aggregation level {1, 2, 4, 8, 16} with respect to the EPDCCH set #2 is set to {1, 2, 1, 1, 0}. In this case, if the number of EPDCCH candidates for aggregation level AL candidates for CCS for one special scheduled cell is increased to twice (i.e., 'candidate for blind decoding BD for the aggregation level AL {1, 2, 4, 8, 16} is increased to {6, 6, 6, 2, 2}', and a candidate for blind decoding BD for the aggregation level AL {1, 2, 4, 8, 16} is increased to {2, 4, 2, 2, 0}'), the number of ECCEs is 32, that is, sufficient in case of the EPDCCH set #1, there is no problem. However, in case of the EPDCCH set #2, the number (i.e., 8) of ECCEs is not sufficient, a problem occurs in that two EPDCCH candidates of the aggregation level AL 8 cannot be supported (i.e., at least 16 ECCEs are required to support all of two EPDCCH candidates of AL 8).

Therefore, the present invention suggests a method for efficiently reallocating (or redistributing) the number of EPDCCH candidates of corresponding aggregation level AL candidates by considering the number of ECCEs that may be used within the maximum range on the special EPDCCH set if it is required to increase the number of EPDCCH candidates of the AL candidates on the special EPDCCH set defined on a special cell (or component carrier) due to i) application of CCS scheme or ii) uplink MIMO (UL-MIMO) scheme under the environment to which carrier aggregation (CA) is applied.

Hereinafter, for convenience of description, the present invention will be described on the assumption of the operation performed if CCS scheme is used under the environment to which CA is applied. Also, the embodiments of the present invention may be configured to determine whether the CCS scheme is used based on that at least one of parameters such as i) special DCI format which is previously defined, ii) special system bandwidth (e.g., whether to satisfy a bandwidth threshold value which is previously defined), iii) a special number of PRB pairs constituting EPDCCH, iv) a special number of EREGs constituting one ECCE, and v) a special number of REs (e.g., whether to satisfy a threshold value of the number of REs which are previously defined) constituting (available for EPEDCCH transmission) one PRP pair is satisfied.

Also, if a transmission mode is varied depending on a cell (or component carrier) and the CCS scheme is used, a DCI format for the scheduling cell on the special EPDCCH set of the scheduling cell and a DCI format for the scheduled cell may be transmitted differently from each other. In this case, previously defined special parameters may be considered (e.g., if system bandwidth is smaller than a threshold value which is previously defined, DCI format 2/2C is configured to configure the same aggregation level AL candidates as those of DCI format 0/1A and apply the number of EPDCCH candidates for the corresponding AL candidates or if system bandwidth is smaller than a threshold value which is previously defined, DCI format 2/2C is configured to configure aggregation level AL candidates different from those of DCI format 0/1A and apply the number of EPDCCH candidates for the corresponding AL candidates, or if system bandwidth is greater than a threshold value which is previously defined, DCI format 2/2C is configured to configure the same aggregation level AL candidates as those of DCI format 0/1A and apply the number of EPDCCH candidates for the corresponding AL candidates or if system bandwidth is greater than a threshold value which is previously defined, DCI format 2/2C is configured to configure aggregation level AL candidates different from those of DCI format 0/1A and apply the number of EPDCCH candidates for the corresponding AL candidates), whereby the AL candidates for the special DCI format and the number of EPDCCH candidates for the corresponding AL candidates may be configured differently. Even in this case, the number of EPDCCH candidates of the corresponding AL candidates may be reallocated (or redistributed) efficiently by considering the number of ECCEs, which may be used within the maximum range on the special EPDCCH set on the scheduling cell, on the basis of configuration of AL candidates defined for a transmission mode (or DCI format) of the scheduled cell on the special EPDCCH set of the scheduling cell and the number of EPDCCH candidates for the corresponding AL candidates.

Figure 11:
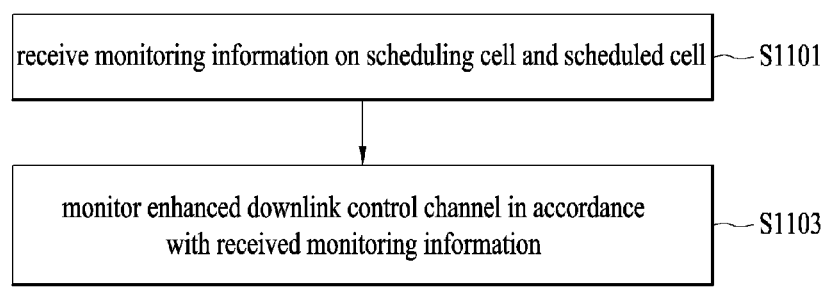
FIG. 11 is a diagram illustrating a method for monitoring a downlink control channel in accordance with one embodiment of the present invention.

FIG. 11 is a diagram illustrating a method for monitoring a downlink control channel in accordance with one embodiment of the present invention. Referring to FIG. 11, the user equipment may receive monitoring information on the scheduling cell and the scheduled cell from the base station (S1101).

The user equipment may monitor a candidate (that is, EPDCCH candidate) for detecting control information through the EPDCCH based on the received monitoring information (S1103).

First Embodiment

As the first embodiment of the present invention, if the number of EPDCCH candidates for special AL candidates for the scheduled cell cross carrier scheduled (CCS) from the corresponding scheduling cell cannot be supported as the number of ECCEs, which may be used within the maximum range on the special EPDCCH set on the scheduling cell, is not sufficient, the number of the other EPDCCH candidates except the number of EPDCCH candidates, which may be supported within the maximum range for the corresponding AL candidates on the special EPEDCCH set on the scheduling cell, may be omitted (or excluded).

In other words, it is assumed that two EPDCCH sets (i.e., EPDCCH set #1 and EPDCCH set #2) on the scheduling cell include 8 PRB pairs and 2 PRB pairs, respectively, one PRP pair includes 4 ECCEs, a candidate for blind decoding (BD) for the aggregation level $\{1, 2, 4, 8, 16\}$ with respect to the EPDCCH set #1 is set to $\{3, 3, 3, 1, 1\}$, and a candidate for blind decoding (BD) for the aggregation level $\{1, 2, 4, 8, 16\}$ with respect to the EPDCCH set #2 is set to $\{1, 2, 1, 1, 0\}$.

In this case, if the number of EPDCCH candidates for aggregation level AL candidates for CCS for one special scheduled cell is increased to twice and at the same time the first embodiment of the present invention is applied, a candidate for blind decoding BD for the aggregation level AL $\{1, 2, 4, 8, 16\}$ may be set to $\{6, 6, 6, 2, 2\}'$ in case of the EPDCCH set #1, and a candidate for blind decoding BD for the aggregation level AL $\{1, 2, 4, 8, 16\}$ may be set to $\{2, 4, 2, 1, 0\}$ in case of the EPDCCH set #2. That is, 16 which is a total number of ECCEs required when the number of the PEDCCH candidates for the aggregation level 8 is 2 in case of the EPDCCH set #2 exceeds the number 8 (that is, 2 (PRB pair)*4 (ECCE)) of ECCEs that may be used within the maximum range for the corresponding aggregation level candidates (that is, 8) in the EPDCCH set #2, whereby the number of the other EPDCCH candidates except the number 1 of EPDCCH candidates, which may be supported within the maximum range, may be omitted.

Second Embodiment

As the second embodiment of the present invention, if the number of EPDCCH candidates for special AL candidates for the scheduled cell cross carrier scheduled (CCS) from the corresponding scheduling cell cannot be supported as the number of ECCEs, which may be used within the maximum range on the special EPDCCH set on the scheduling cell, is not sufficient, the number of the other EPDCCH candidates except the number of EPDCCH candidates, which may be supported within the maximum range for the corresponding AL candidates on the special EPEDCCH set on the scheduling cell, may be reallocated to be filled from the highest AL candidates of AL candidates relatively smaller than the corresponding AL candidates (or AL candidates which are previously defined).

Also, with respect to the aforementioned second embodiment, if the number of EPDCCH candidates remains (that is, if all the EPDCCH candidates are not redistributed), the corresponding remaining EPDCCH candidates may be omitted (or excluded) or reallocated to another EPDCCH set defined on the scheduling cell.

In this case, if the remaining EPDCCH candidates which are not supported by the special EPDCCH set on the scheduling cell are reallocated to another EPDCCH set defined on the scheduling cell, it may be configured that operation may be performed on the basis of a previously defined rule, that is, a rule for reallocating the remaining EPDCCH candidates to another EPDCCH set on the scheduling cell defined by the number of (or the number of ECCEs greater than or equal to the special EPDCCH set) PRB pairs greater than or equal to the special EPDCCH set.

That is, it is assumed that two EPDCCH sets (i.e., EPDCCH set #1 and EPDCCH set #2) on the scheduling cell include 8 PRB pairs and 2 PRB pairs, respectively, one PRP pair includes 4 ECCEs, a candidate for blind decoding (BD) for the aggregation level {1, 2, 4, 8, 16} with respect to the EPDCCH set #1 is set to {3, 3, 3, 1, 1}, and a candidate for blind decoding (BD) for the aggregation level {1, 2, 4, 8, 16} with respect to the EPDCCH set #2 is set to {1, 2, 1, 1, 0}.

In this case, if the number of EPDCCH candidates for AL candidates for CCS for one special scheduled cell is increased to twice and at the same time the special rule (i.e., rule for reallocating the corresponding remaining EPDCCH candidates to another EPDCCH set defined on the scheduling cell) according to the second embodiment of the present invention is used, a candidate for blind decoding BD for the aggregation level AL {1, 2, 4, 8, 16} may be designated to {6, 6, 6, 2, 2}' in case of the EPDCCH set #1, and a candidate for blind decoding BD for the aggregation level AL {1, 2, 4, 8, 16} may be designated to {3, 4, 2, 1, 0} in case of the EPDCCH set #2. That is, 16 which is a total number of ECCEs required when the number of the PEDCCH candidates for the aggregation level 8 is 2 in case of the EPDCCH set #2 exceeds the number 8 (that is, 2 (PRB pair)*4 (ECCE)) of ECCEs that may be used within the maximum range for the corresponding aggregation level candidates (that is, 8) in the EPDCCH set #2, whereby the corresponding EPDCCH candidates may be reallocated to be filled from the highest AL candidates of AL candidates having AL lower than the aggregation level AL 8 which is previously defined. At this time, since the number of EPDCCH candidates is 2 in case of the aggregation level 4, the aggregation level 4 corresponds to the number (that is, 8) of ECCEs that may be used within the maximum range, and the number of EPDCCH candidates is 4 even in case of the relatively small aggregation level 2 and corresponds to the number of ECCEs that may be used within the maximum range. Therefore, since the number of EPDCCH candidates is 2 in case of the relatively smaller aggregation level 1, the number of the remaining EPDCCH candidates is reallocated.

Also, if the number of EPDCCH candidates for special AL candidates for the scheduled cell cross carrier scheduled (CCS) from the corresponding scheduling cell cannot be supported as the number of ECCEs, which may be used within the maximum range on the special EPDCCH set on the scheduling cell, is not sufficient, the number of the other EPDCCH candidates except the number of EPDCCH candidates, which may be supported within the maximum range for the corresponding AL candidates on the special EPEDCCH set on the scheduling cell, may be reallocated to be filled from the smallest AL candidates of AL candidates relatively greater than the corresponding AL candidates (or AL candidates which are previously defined).

Moreover, if the remaining EPDCCH candidates which are not supported by the special EPDCCH set on the scheduling cell are reallocated to another EPDCCH set defined on the scheduling cell, it may be configured that operation may be performed on the basis of a previously defined rule, that is, i) the number of PRB pairs greater than or equal to the special EPDCCH set or ii) the number of ECCEs greater than or equal to the special EPDCCH set.

Third Embodiment

As the third embodiment of the present invention, if the number of EPDCCH candidates for special AL candidates for the scheduled cell cross carrier scheduled (CCS) from the corresponding scheduling cell cannot be supported as the number of ECCEs, which may be used within the maximum range on the special EPDCCH set on the scheduling cell, is not sufficient, the number of the other EPDCCH candidates except the number of EPDCCH candidates, which may be supported within the maximum range for the corresponding AL candidates on the special EPEDCCH set on the scheduling cell, may first be filled as the number of EPDCCH candidates of the same AL candidates on another EPDCCH set defined on the scheduling cell.

Moreover, even after the embodiment of the present invention is applied, if the number of EPDCCH candidates for the special aggregation level candidates remains, a rule may be defined such that the corresponding remaining EPDCCH candidates may be omitted (or excluded).

For example, it is assumed that two EPDCCH sets (i.e., EPDCCH set #1 and EPDCCH set #2) on the scheduling cell include 8 PRB pairs and 2 PRB pairs, respectively, one PRP pair includes 4 ECCEs, a candidate for blind decoding (BD) for the aggregation level {1, 2, 4, 8, 16} with respect to the EPDCCH set #1 is set to {3, 3, 3, 1, 1}, and a candidate for blind decoding (BD) for the aggregation level {1, 2, 4, 8, 16} with respect to the EPDCCH set #2 is set to {1, 2, 1, 1, 0}.

In this case, if the number of EPDCCH candidates for AL candidates for CCS for one special scheduled cell is increased to twice and at the same time the suggested method is applied, the candidate for blind decoding BD for the aggregation level AL {1, 2, 4, 8, 16} may be designated to {6, 6, 6, 3, 2}' in case of the EPDCCH set #1, and the candidate for blind decoding BD for the aggregation level AL {1, 2, 4, 8, 16} may be designated to {2, 4, 2, 1, 0} in case of the EPDCCH set #2.

The embodiments of the present invention may be applied extensively if the number of EPDCCH candidates of AL candidates on the special EPDCCH set defined on the special cell (or component carrier) required to be increased due to application of CCS scheme or uplink MIMO (UL-MIMO) scheme under the environment to which carrier aggregation (CA) is applied. That is, in this case, a rule may be defined such that EPDCCH candidates split configuration (e.g., Proportional BD split or Equal BD split) for a plurality of EPDCCH sets previously defined in a special cell (or component carrier) is maintained as it is and the number of EPDCCH candidates (for aggregation level candidates which are previously defined) for another cell (that is, scheduled cell) or uplink MIMO is increased. In this case, Proportional BD split means a rule defined such that more EPDCCH candidates (or EPDCCH candidates of relatively high aggregation level AL) are reallocated if the number of PRB pairs constituting the special EPDCCH set is relatively great. The Equal BD split means a rule defined such that EPDCCH candidates for special AL between EPDCCH sets are reallocated equally.

Although the aforementioned various embodiments of the present invention may be implemented independently, it will be apparent that some of the aforementioned embodiments of the present invention may be implemented in combination as the case may be or all of the aforementioned embodiments of the present invention may be implemented in combination within the technical solutions suggested in the present invention.

Figure 12:
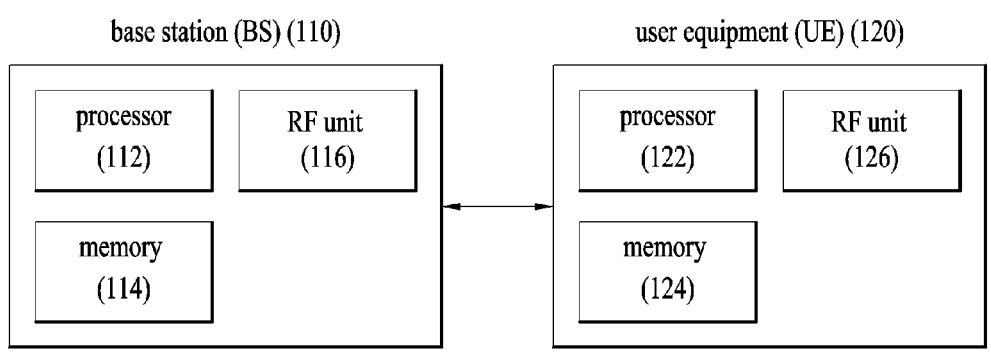
FIG. 12 is a diagram illustrating a base station and a user equipment, which may be applied to the embodiment of the present invention.

FIG. 12 is a diagram illustrating a base station and a user equipment, which may be applied to the embodiment of the present invention. If a relay is included in a wireless communication system, communication in a backhaul link is performed between the base station and the relay and communication in an access link is performed between the relay and the user equipment. Accordingly, the base station or the user equipment as shown may be replaced with the relay depending on the circumstances.

Referring to FIG. 12, the wireless communication system includes a base station (BS) 110 and a user equipment (UE) 120. The base station 110 includes a processor 112, a memory 114, and a radio frequency (RF) unit 116. The processor 112 may be configured to implement procedures and/or methods suggested in the present invention. The memory 114 is connected with the processor 112 and stores various kinds of information related to the operation of the processor 112. The RF unit 116 is connected with the processor 112 and transmits and/or receives a radio signal. The user equipment 120 includes a processor 122, a memory 124, and a radio frequency (RF) unit 126. The processor 122 may be configured to implement procedures and/or methods suggested in the present invention. The memory 124 is connected with the processor 122 and stores various kinds of information related to the operation of the processor 122. The RF unit 126 is connected with the processor 122 and transmits and/or receives a radio signal. The base station 110 and/or the user equipment 120 may have a single antenna or multiple antennas.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments according to the present invention may be implemented by various means, for example, hardware, firmware, software, or their combination. If the embodiments according to the present invention are implemented by hardware, the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiments according to the present invention are implemented by firmware or software, the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention may be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

Although the aforementioned method for monitoring a downlink control channel in a wireless communication system and the apparatus for the same have been described based on the 3GPP LTE system, the method and apparatus may be applied to various wireless communication systems in addition to the 3GPP LTE system.

The invention claimed is:

1. A method for monitoring an enhanced physical downlink control channel (EPDCCH), by a user equipment, in a wireless communication system supporting carrier aggregation, the method comprising the steps of:
receiving, from a base station, monitoring information on a first cell and a second cell cross-carrier scheduled from the first cell; and
monitoring the EPDCCH on the basis of the monitoring information,
wherein the monitoring information includes information that the number of EPDCCH candidates on the first cell is reallocated, when the maximum number of enhanced control channel elements (ECCE) available in a specific EPDCCH set on the first cell does not support the number of the EPDCCH candidates of a special aggregation level related to the second cell.

2. The method according to claim 1, wherein the information that the number of EPDCCH candidates on the first cell is reallocated is information allocated as the number of EPDCCH candidates, which exceeds the maximum number of ECCEs available in the special EPDCCH set on the first cell, is omitted.

3. The method according to claim 1, wherein the information that the number of EPDCCH candidates on the first cell is reallocated is information that the number of EPDCCH candidates is reallocated at an aggregation level less than the special aggregation level.

4. The method according to claim 1, wherein the information that the number of EPDCCH candidates on the first cell is reallocated is information that the number of EPDCCH candidates on the second cell for the special EPDCCH set is reallocated as the number of EPDCCH candidates on the first cell for the special aggregation level.

5. The method according to claim 1, wherein the first cell is a scheduling cell, and the second cell is a scheduled cell.

6. A user equipment for monitoring an enhanced physical downlink control channel (EPDCCH) in a wireless communication system, which supports carrier aggregation, the user equipment comprising:
a radio frequency (RF) unit; and
a processor,
wherein the processor is configured to receive, from a base station, monitoring information on a first cell and a second cell cross-carrier scheduled from the first cell and monitor the EPDCCH on the basis of the monitoring information, and the monitoring information includes information that the number of EPDCCH candidates on the first cell is reallocated, when the maximum number of enhanced control channel elements (ECCE)) available in a specific EPDCCH set on the first cell does not support the number of the EPDCCH candidates of a special aggregation level related to the second cell.

7. The user equipment according to claim 6, wherein the information that the number of EPDCCH candidates on the first cell is reallocated is information allocated as the number of EPDCCH candidates, which exceeds the maximum number of ECCEs available in the special EPDCCH set on the first cell, is omitted.

8. The user equipment according to claim 6, wherein the information that the number of EPDCCH candidates on the first cell is reallocated is information that the number of EPDCCH candidates is reallocated at an aggregation level less than the special aggregation level.

9. The user equipment according to claim 6, wherein the information that the number of EPDCCH candidates on the first cell is reallocated is information that the number of EPDCCH candidates on the second cell for the special EPDCCH set is reallocated as the number of EPDCCH candidates on the first cell for the special aggregation level.

10. The user equipment according to claim 6, wherein the first cell is a scheduling cell, and the second cell is a scheduled cell.

* * * * *